(12) United States Patent
Tani et al.

(10) Patent No.: US 9,420,131 B2
(45) Date of Patent: Aug. 16, 2016

(54) IMAGE FORMING APPARATUS HAVING ELECTRICAL UNIT PROJECTING FROM TOP SURFACE

(71) Applicant: CANON KABUSHIKI KAISHA, Tokyo (JP)

(72) Inventors: Nobuhiro Tani, Matsudo (JP); Takashi Fujita, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/842,833

(22) Filed: Sep. 2, 2015

(65) Prior Publication Data

US 2016/0072973 A1  Mar. 10, 2016

(30) Foreign Application Priority Data

Sep. 9, 2014  (JP) ................................ 2014-183168

(51) Int. Cl.
*G03G 15/00* (2006.01)
*H04N 1/00* (2006.01)

(52) U.S. Cl.
CPC ....... *H04N 1/00538* (2013.01); *H04N 1/00326* (2013.01); *H04N 1/00543* (2013.01); *H04N 2201/0082* (2013.01); *H04N 2201/0087* (2013.01); *H04N 2201/0093* (2013.01); *H04N 2201/0094* (2013.01)

(58) Field of Classification Search
CPC .......... H04N 1/00538; H04N 1/00326; H04N 1/00543; H04N 2201/0082; H04N 2201/0087; H04N 2201/0094
See application file for complete search history.

(56) References Cited

U.S. PATENT DOCUMENTS 5,917,850 A    6/1999  Fujita et al.
7,734,214 B2 * 6/2010  Masuda ............. G03G 21/1619
                                                    399/107

FOREIGN PATENT DOCUMENTS

JP         2002-311760 A     10/2002

* cited by examiner

*Primary Examiner* — G. M. Hyder
(74) *Attorney, Agent, or Firm* — Fitzpatrick, Cella, Harper & Scinto

(57) ABSTRACT

An image forming apparatus includes an apparatus body, an image forming portion contained within the apparatus body, a control board controlling the image forming portion, an electrical unit, a storage device attachable to /removable out of the electrical unit, and a storage portion. The electrical unit includes the control board disposed along a vertical direction, provided so as to project upward on an upper surface of the apparatus body, and disposed on a back side of the apparatus body on the upper surface of the apparatus body.

10 Claims, 4 Drawing Sheets

IMAGE FORMING APPARATUS HAVING ELECTRICAL UNIT PROJECTING FROM TOP SURFACE

BACKGROUND OF THE INVENTION

1. Field of the Invention

The present invention relates to an image forming apparatus and more specifically to an electrical unit containing a removable storage device such as a hard disk drive.

2. Description of the Related Art

Hitherto, an electro-photographic image forming apparatus is widely applied as a copier, a printer, a plotter, a facsimile, a multi-function printer having a plurality of such functions, and others. Then, an image forming apparatus specifically developed lately is what called a digital compound machine including an image transmission function of exchanging an image by communicating with another device or a terminal through a network, in addition to conventional image reading and printing functions. Such image forming apparatus uses a removable large volume storage device (referred to simply as a 'storage device' hereinafter) such as a hard disk drive (referred to simply as a 'HDD' hereinafter) in order to store and access to a large volume of image information. Then, because a large amount of image information is stored in the HDD, a user's need of periodically pulling the HDD out of the image forming apparatus and keeping the HDD is increasing lately from an aspect of secrecy of the stored image information.

The image forming apparatus includes a control board (image controller) mounting a CPU and others as a control unit. The control board is often mounted on a back of the image forming apparatus from such aspects that its size is large and that there is no direct access of the user. It is preferable to dispose the control board and the HDD closely from each other because the HDD is connected with the control board through a cable to transmit/receive image information. To that end, Japanese Patent Application Laid-open No. 2002-311760 has developed an image forming apparatus in which the HDD is disposed on a back of a body of the apparatus (referred to as an 'apparatus body' hereinafter), i.e., in a vicinity of the control board mounted on the back of the apparatus body, to connect with the control board.

However, because the HDD and the control board are mounted on the back of the apparatus body in the image forming apparatus disclosed in Japanese Patent Application Laid-open No. 2002-311760, it is difficult to reduce an installation space of the apparatus body. If the HDD and the control board are provided on an upper surface of the apparatus body for example in order to reduce the installation space of the apparatus body, there is such a problem that workability in a work space on the upper surface of the apparatus body drops due to such reasons that flatness of the work space is hampered and that level of the work space is heightened. It is desirable for a user, e.g., a user of a wheel chair, who has difficulty reaching the work space on the upper surface of the apparatus body to be able to improve the workability in the work space.

SUMMARY OF THE INVENTION

According to one aspect of the invention, an image forming apparatus, comprising: an apparatus body; an image forming portion, contained within the apparatus body, configured to being capable of forming an image based on image information; a control board positioned and configured to control the image forming portion; an electrical unit, including the control board disposed along a vertical direction, which is provided such that the control board projects upward on an upper surface of the apparatus body, and is disposed on a back side of the apparatus body on the upper surface of the apparatus body; a storage device removably attached to the electrical unit positioned and configured to store image information; and a storage portion, provided in the electrical unit, positioned and configured to store the storage device at a position electrically connected with the control board.

Further features of the present invention will become apparent from the following description of exemplary embodiments with reference to the attached drawings.

DESCRIPTION OF THE EMBODIMENTS

An embodiment of the present invention will be described in detail below with reference to FIGS. 1 through 4C. It is noted that as shown in each drawing, a front side facing the image forming apparatus 2 will be denoted as a front direction F, a rear side (back side) thereof as a back direction B, a left side thereof as a left direction L, a right side thereof as a right direction R, an upper side thereof as an upper direction U, and a lower side thereof as a lower direction D, respectively.

An image forming system 1 of the present embodiment includes the image forming apparatus 2, i.e., a printer, and a sheet processing apparatus 3, i.e., a finisher, located adjacent the side in the left direction L of the image forming apparatus 2. The sheet processing apparatus 3 executes a predetermined process such as stapling and punching through holes on a sheet discharged out of the image forming apparatus 2. A tandem type-full color printer will be described as one exemplary image forming apparatus in the present embodiment. However, the printer is not limited to be the tandem type image forming apparatus 2, and the present invention is applicable also to an image forming apparatus of another type. Still further, the printer is not limited to be the full-color printer and may be a monochrome or mono-color printer.

Figure 1:
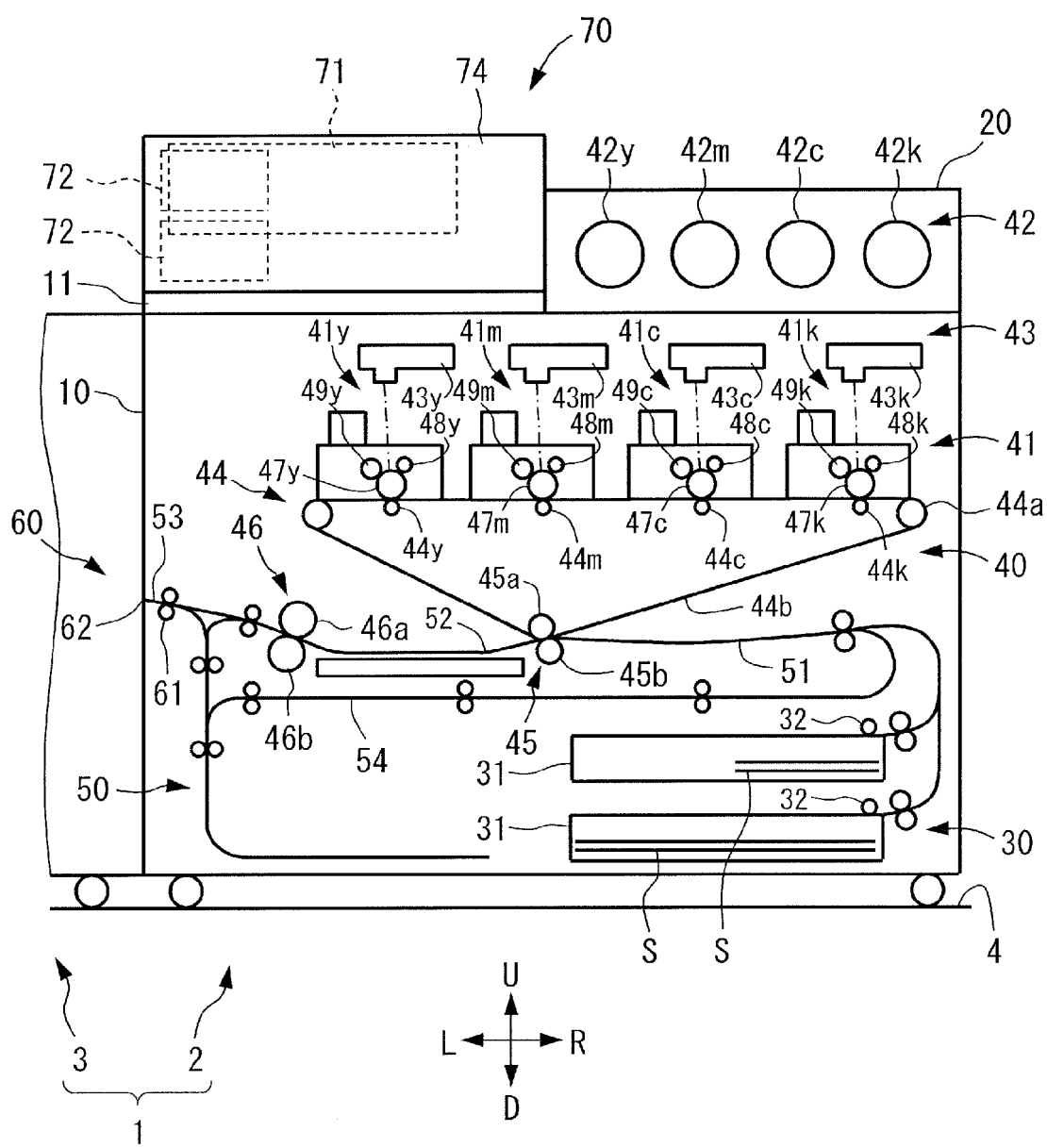
FIG. 1 is a section view schematically illustrating an image forming apparatus of an embodiment.

As shown in FIG. 1, the image forming apparatus 2 includes an image forming apparatus body (referred to simply as an 'apparatus body' hereinafter) 10. The apparatus body 10 also includes a sheet feed portion 30, an image forming portion 40, a sheet conveying portion 50, a sheet discharging portion 60, an electrical unit 70, and a toner supplying unit 20. It is noted that the sheet S, i.e., recording medium, is what a toner image is formed thereon and may be a plain sheet, a synthetic resin sheet as a substitute of the plain sheet, a thick sheet, an overhead projector sheet, or the like for example.

The sheet feed portion 30 is disposed at a lower part of the apparatus body 10, includes a sheet cassette 31 stacking and storing the sheet S and a feed roller 32, and feeds the sheet S to the image forming portion 40.

The image forming portion 40 includes image forming units 41, tonner bottles 42 provided in the toner supplying unit 20, exposure units 43, intermediate transfer unit 44, a secondary transfer portion 45, and a fixing unit 46, and forms an image based on image information.

The image forming unit 41 includes four image forming units 41y, 41m, 41c, and 41k for forming four color toner images of yellow (y), magenta (m), cyan (c), and black (k). These image forming units are configured such that a user of the apparatus can attach/remove these units to/out of the apparatus body 10. For instance, the image forming unit 41y includes a photosensitive drum (image carrier) 47y carrying an image and forming a toner image, a charging roller 48y electrifying a surface of the photosensitive drum 47y, a developing sleeve 49y, a drum cleaning blade not shown and others. Toner is supplied to the image forming unit 41y from a toner bottle 42y in which the toner is filled. Because the other image forming units 41m, 41c, and 41k have the similar structure respectively with the image forming unit 41y except of the colors of the toners, they will be shown just by changing signs denoting the colors of the toners and their detailed description will be omitted here.

The exposure unit 43y exposes the electrified surface of the photosensitive drum 47y and forms an electrostatic latent image on the surface of the photosensitive drum 47y. The exposure unit 43y is disposed above the photosensitive drum 47y.

The intermediate transfer unit 44 is disposed in a lower direction D of the image forming unit 41. The intermediate transfer unit 44 includes a plurality of rollers such as a driving roller 44a and primary transfer rollers 44y, 44m, 44c, and 44k, and an intermediate transfer belt 44b wrapped around these rollers. The primary transfer rollers 44y, 44m, 44c, and 44k are disposed such that they face respectively to the photosensitive drums 47y, 47m, 47c, and 47k and are in contact with the intermediate transfer belt 44b. The respectively toner images having negative polarity on the photosensitive drums 47y, 47m, 47c, and 47k are sequentially superimposed and transferred onto the intermediate transfer belt 44b by applying positive transfer bias to the intermediate transfer belt 44b by means of the primary transfer rollers 44y, 44m, 44c, and 44k. Thereby, a full-color image is formed on the intermediate transfer belt 44b.

The secondary transfer portion 45 includes a secondary transfer inner roller 45a and a secondary transfer outer roller 45b. The full-color image formed on the intermediate transfer belt 44b is transferred onto a sheet S by applying a positive secondary transfer bias to the secondary transfer outer roller 45b. It is noted that the secondary transfer inner roller 45a tensions the intermediate transfer belt 44b within the intermediate transfer belt 44b and the secondary transfer outer roller 45b is provided at a position facing the secondary transfer inner roller 45a while interposing the intermediate transfer belt 44b.

The fixing unit 46 includes a fixing roller 46a and a pressure roller 46b. The toner image transferred onto the sheet S is heated and pressed to fix to the sheet S as the sheet S is nipped and conveyed between the fixing roller 46a and the pressure roller 46b.

The sheet conveying portion 50 includes a pre-secondary transfer conveying path 51, a pre-fixing conveying path 52, a discharging path 53, and a re-conveying path 54 to convey the sheet S fed from the sheet feed portion 30 to the sheet discharging portion 60 via the image forming portion 40.

The sheet discharging portion 60 includes a discharge roller pair 61 disposed downstream of the discharging path 53 and a discharge port 62 disposed on a side portion on a side in a left direction L of the apparatus body 10. The discharge roller pair 61 feeds the sheet S conveyed from the discharging path 53 by a nip portion thereof to discharge out of the discharge port 62. The discharge port 62 is configured to be able to feed the sheet S to the sheet processing apparatus 3 disposed on the side in the left direction L of the apparatus body 10.

The electrical unit 70 is disposed on a side in a back direction B of an upper surface 10a (see FIG. 2) of the apparatus body and on a side adjacent to the left direction L of the toner supplying unit 20 such that the electrical unit 70 projects upward on the upper surface 10a of the apparatus body 10. The electrical unit 70 contains an image controller (control board) 71 including a control portion and a removable HDD (storage device) 72. The control portion is composed of a computer and includes a CPU, a ROM storing programs controlling the respective portions, a RAM temporarily storing data, and an input/output circuit inputting/outputting signals from/to an outside for example. The CPU is a microprocessor administering an entire control of the image forming apparatus 2 and is a main body of a system controller.

The image controller 71 is connected with the sheet feed portion 30, the image forming portion 40, the sheet conveying portion 50, the sheet discharging portion 60, and the HDD 72 through the input/output circuit to exchange signals with the respective portions and to control operations of the respective portions. Still further, the image controller 71 is configured such that the user can manipulate and set the image controller 71 by instructing through a computer not shown or by manipulating a manipulation panel not shown. The image controller 71 is also provided with an insertion slot enabling a serviceman to insert a removable media such as a USB memory to input printing image data or to install a latest version firmware or optional software.

The HDD 72 is a removable large volume storage device storing electronic data and can store mainly image processing programs, digital image data, and associated information of the digital image data. In forming an image, image data is read out of the HDD 72. Here, as the HDD 72, a HDD of a disk-like storage medium of 3.5 inch is applied. However, the storage device of the present invention is not limited to be the 3.5 inch HDD and may be 2.5 inch HDD, a SSD, a magneto-optical disk drive (MO, MD), or the like. It is noted that a specific structure of the electrical unit 70 will be described later.

Next, an image forming operation of the image forming apparatus 2 constructed as described above will be described.

In response to a start of the image forming operation, the photosensitive drums 47y, 47m, 47c, and 47k are rotated at first such that the surfaces thereof are electrified by the charging roller 48y, 48m, 48c, and 48k. Then, laser beams are irradiated from the exposure units 43y, 43m, 43c, and 43k to the photosensitive drums 47y, 47m, 47c, and 47k based on image information, and electrostatic latent images are formed on the surfaces of the photosensitive drums 47y, 47m, 47c, and 47k. The electrostatic latent images are developed and visualized as toner images as toners are applied to the electrostatic latent images. The toner images are then transferred sequentially onto the intermediate transfer belt 44b.

Meanwhile, concurrently with such toner image forming operation, the feed roller 32 is rotated to feed an uppermost sheet S of the sheet cassette 31 while separating from a bundle of sheets S. Then, in synchronism with the toner image on the intermediate transfer belt 44b, the sheet S is conveyed to the secondary transfer portion 45 through the pre-secondary transfer conveying path 51. The image is transferred from the intermediate transfer belt 44b to the sheet S. The sheet S to which the image has been transferred is conveyed to the fixing unit 46 such that the non-fixed toner image is heated and pressurized to be fixed on the surface of the sheet S. The sheet S which has undergone the fixation is discharged by the discharge roller pair 61 out of the discharge port 62 and is supplied to the sheet processing apparatus 3.

Next, the electrical unit 70 will be described in detail with reference to FIGS. 2 through 4C.

Figure 2:
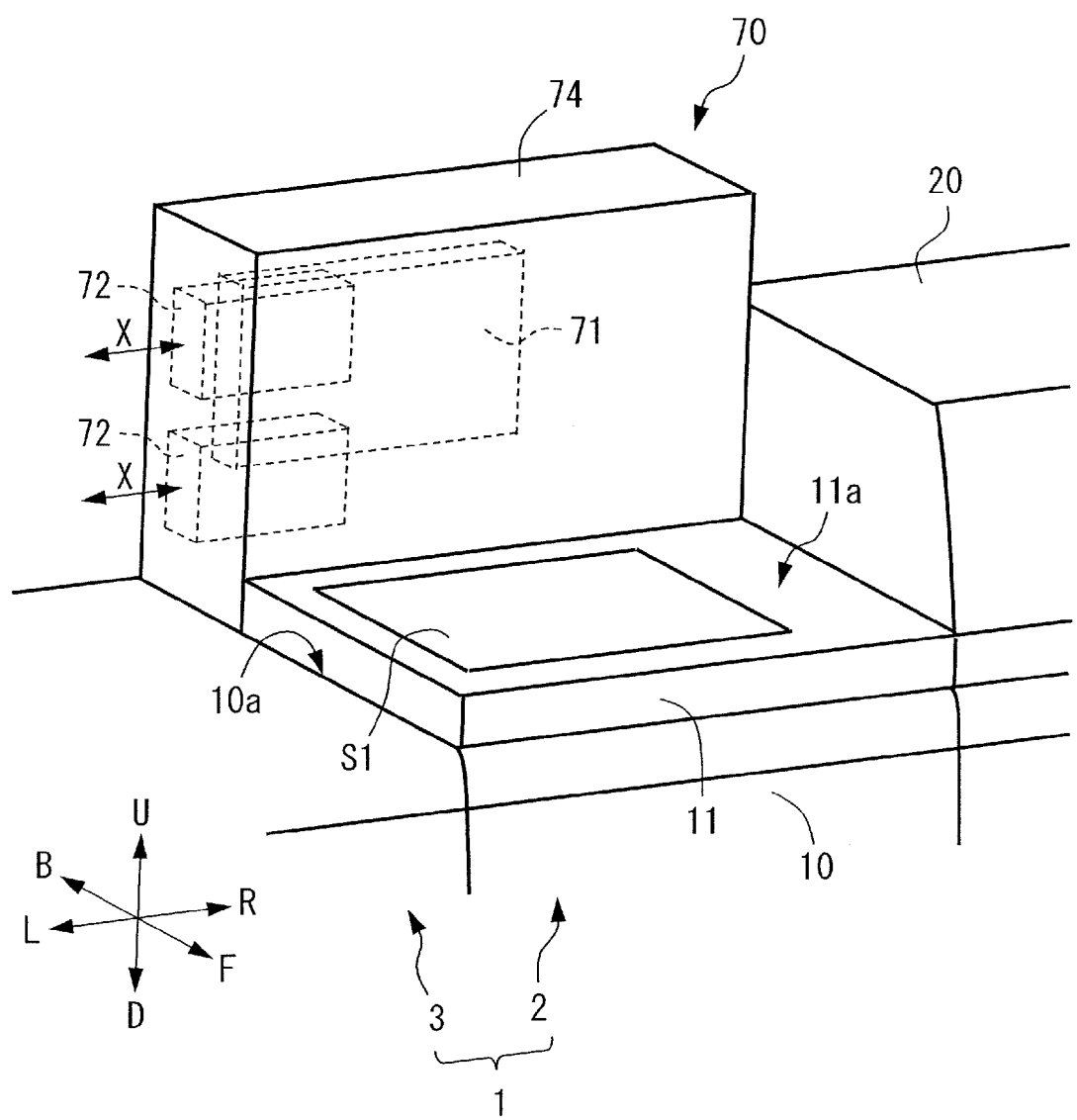
FIG. 2 is a perspective view illustrating an upper part of an apparatus body and an electrical unit of the image forming apparatus of the embodiment.

As shown in FIG. 2, the electrical unit 70 is provided on the side in the back direction B side of the upper surface 10a of the apparatus body 10. An upper cover 11 is removably provided on a side of a front direction F of the electrical unit 70 on the upper surface 10a. An upper surface of the upper cover 11 is a flat surface and forms a work space 11a. That is, the work space 11a is a front side part, on the apparatus body 10, of the electrical unit 70 within the upper surface 10a of the apparatus body 10. The work space 11a is set to be wider than a maximum size sheet S1 on which the image forming apparatus 2 can form an image, e.g., an A3 size sheet.

According to the present embodiment, the work space 11a is set at a level of 1000 mm from a floor surface 4. Because the level of 1000 mm of the work space 11a is a level on which users of a wide range of heights can easily work, working efficiency may be improved even if the users of the wide range of heights including persons with low body heights use the work space 11a while standing in front of the apparatus body 10. This level also makes it possible for a user of a wheel chair to relatively readily use the work space 11a. It is noted that works using the work space 11a may be a check of a document, colorimetric works and the like for example.

Figure 3:
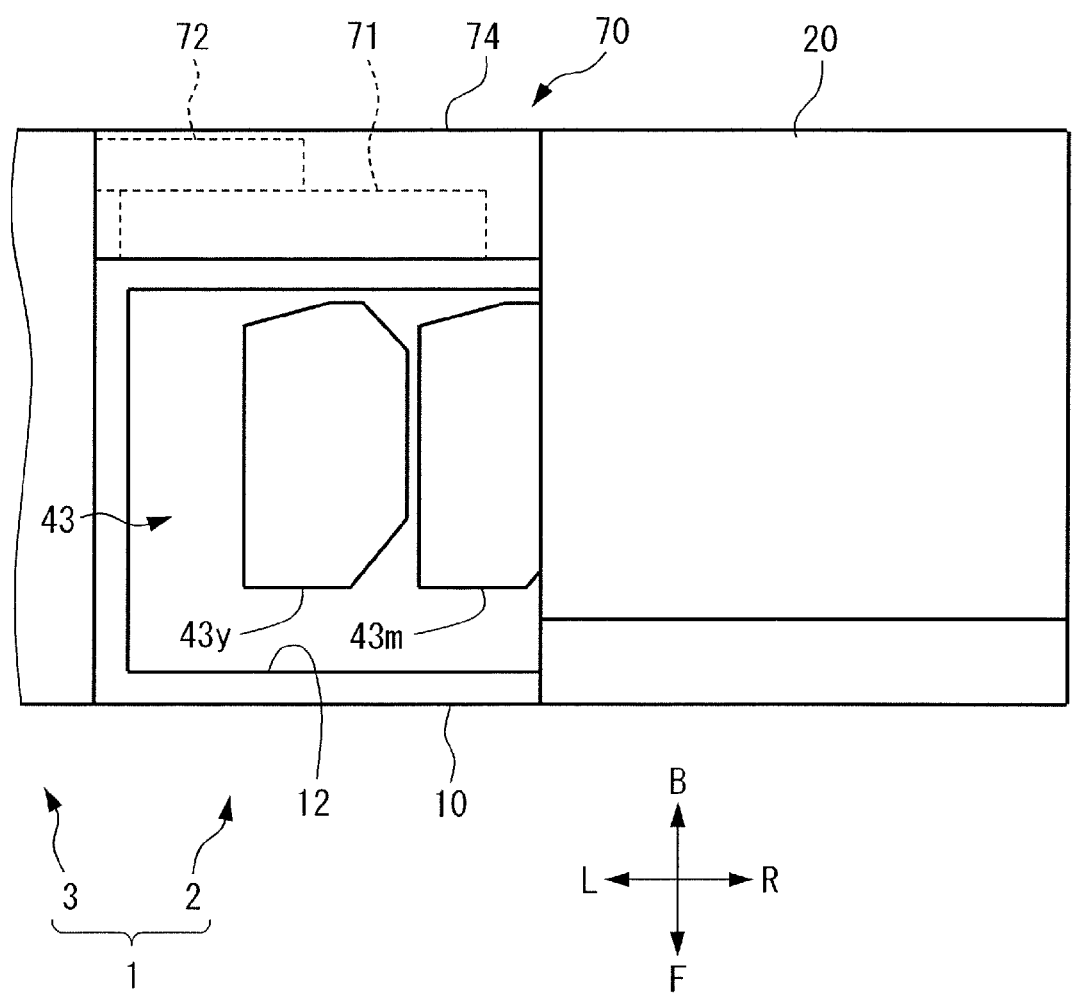
FIG. 3 illustrates a positional relationship between the electrical unit and an exposure unit of the image forming apparatus of the embodiment.

As shown in FIG. 3, the apparatus body 10 is provided with an opening portion 12 enabling an access to an inside the apparatus body 10 from the outside at an upper part of the apparatus body 10. The upper cover 11 is disposed to open/close the opening portion 12. The electrical unit 70 is disposed on the side in the back direction B from the exposure units 43y and 43m, when seen from right above the apparatus body 10, such that the electrical unit 70 does not overlap with end portions on the side in the back direction B of the exposure units 43y and 43m. That is, the exposure units 43y and 43m are disposed under the opening portion 12 and can be replaced through the opening portion 12 by uncovering the upper cover 11. This arrangement makes it possible to restrain the workability from dropping in attaching/removing the exposure units 43y and 43m to/out of the apparatus body 10 by uncovering the upper cover 11 during maintenance of the apparatus body 10 because the electrical unit 70 does not interfere the exposure units 43y and 43m.

Here, it is preferable to provide the image controller 71 in a vicinity of the exposure unit 43 from aspects of shortening signal lines and of avoiding signal attenuation. However, if the image controller 71 is provided horizontally within the apparatus body 10 in a vicinity of the exposure unit 43, the level of the image forming apparatus 2 increases and the workability drops for persons whose body height is short in particular. Meanwhile, if the image controller 71 is provided vertically within the apparatus body 10 in the vicinity of the exposure unit 43, the image forming apparatus 2 is prolonged in the front-back direction and the installation space thereof increases. From these problems, it has been desired to be able to improve the workability in the work space on the upper surface of the apparatus body 10 while reducing the installation space of the apparatus body 10.

Figure 4A:
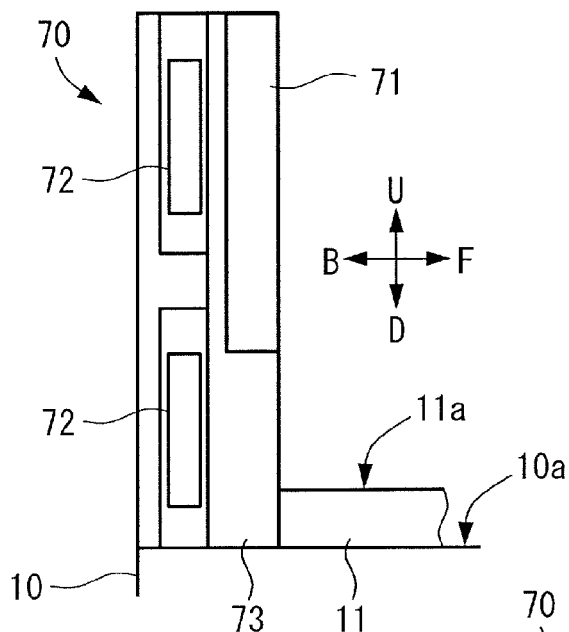
FIG. 4A is a side view illustrating a state in which inner and outer covers of the electrical unit of the image forming apparatus of the embodiment are detached.
Figure 4B:
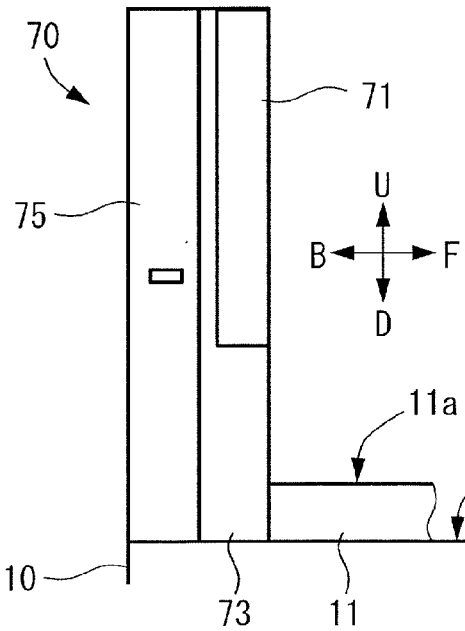
FIG. 4B is a side view illustrating a state in which the inner cover of the electrical unit of the image forming apparatus of the embodiment is attached and the outer cover is detached.
Figure 4C:
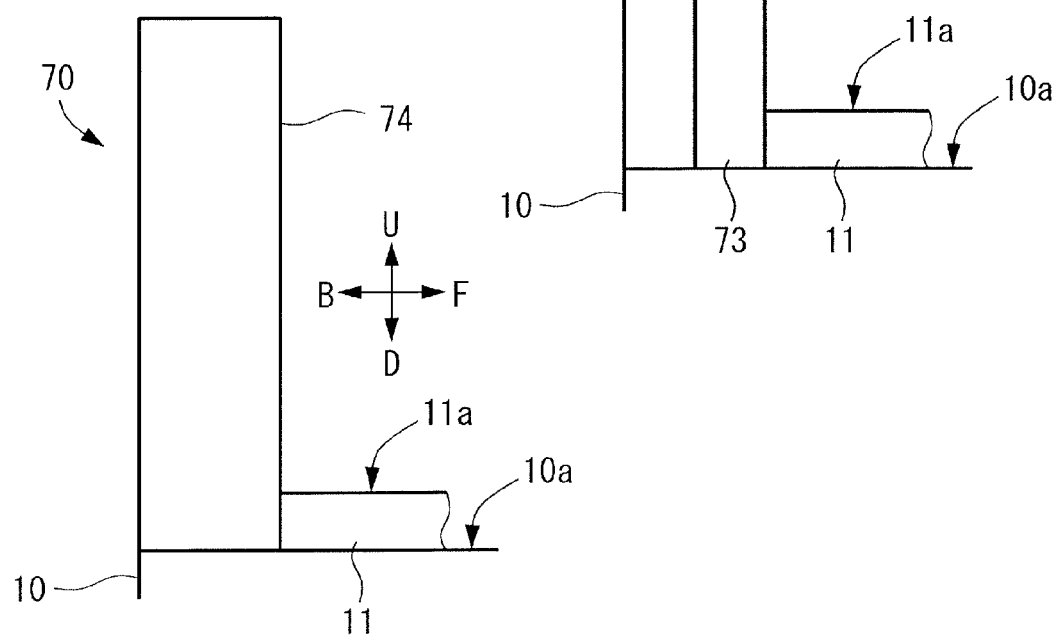
FIG. 4C is a side view illustrating a state in which the outer cover of the electrical unit of the image forming apparatus of the embodiment is attached.

As shown in FIGS. 4A through 4C, the electrical unit 70 includes a frame (storage portion) 73 to which the image controller 71 and the HDD 72 are attached and an outer cover 74 covering the entire frame 73 from above. The image controller 71 is securely and unremovably supported, and the HDD 72 is removably supported in the frame 73. The HDD 72 can be inserted/removed into/out of the frame 73 in a right and left direction (a horizontal direction) X (see FIG. 2) on the side in the left direction L of the frame 73. A removable system which enables connection of the HDD 72 with a connector and electrical access to the image controller 71 through attachment is adopted. The frame 73 stores the HDD 72 at a position provided in the electrical unit 70 and electrically connected with the image controller 71. That is, in response to attachment of the HDD 72 to the electrical unit 70, the HDD 72 is connected with the image controller 71 and becomes capable of storing image information.

Because the HDD 72 can be inserted/removed into/out of the frame 73 in the right and left direction X on the side in the left direction L of the frame 73, the HDD 72 can be inserted/removed into/out of the frame 73 without interfering with the toner supplying unit 20 disposed on the side in the right direction R of the electrical unit 70. That is, the image forming portion 40 includes the toner supplying unit 20 (the toner bottles 42) on either one direction (the right direction R) side of the right and left directions X of the electrical unit 70, and the HDD 72 can be attached/removed to/out of the electrical unit 70 from either other direction (the left direction L) side of the right and left directions X. It is noted that in the present embodiment, the sheet processing apparatus 3 is disposed on the either other direction (the left direction L) side of the right and left directions X of the electrical unit 70.

As shown in FIG. 4A, the image controller 71 is supported on the side in the front direction F of the frame 73 while directing its thickness direction in conformity with the front-back direction. That is, the image controller 71 is disposed vertically within the electrical unit 70. Two HDDs 72 are disposed by directing their thickness direction in conformity with the front-back direction and their longitudinal direction in conformity with the right and left direction X, i.e., while vertically arraying on the side in the back direction B of the frame 73 with a posture horizontally erected. In other words, the HDD 72s are formed into a rectangular parallelepiped shape, respectively, and are disposed such that their thickness direction is paralleled with the front-back direction of the apparatus body 10. This arrangement makes it possible to minimize a thickness in the front-back direction of the electrical unit 70 and to assure the wide work space 11a on the side in the front direction F of the electrical unit 70.

Here, in the present embodiment, the two HDDs 72 are used to realize a mirroring system. That is, this mirroring system uses a mirroring technology of storing identical information into at least two storage media and of compensating by the other storage medium even if some problem occurs in one storage medium. Accordingly, one HDD 72 is adopted as a normal storage HDD and another HDD 72 as a mirror HDD for copied data. However, the storage system by means of the HDDs 72 is not limited to the mirroring system using the two HDDs 72 and may be what uses three or more HDDs or what uses only single HDD and using no mirroring system.

The HDD 72 can be inserted/removed into/out of the frame 73 in the right and left direction X on the side of the left direction L of the frame 73 with the position horizontally erected as shown in FIG. 2. As shown in FIG. 4B, an inner cover 75 covering the attached HDD 72 is removably provided at an insertion/removal slot of the HDD of the frame 73.

As shown in FIG. 4C, the frame 73 of the electrical unit 70 is removably covered by the box-like outer cover 74.

The electrical unit 70 (the image controller 71) is also provided with the insertion slots enabling removable media such as a USB memory to be inserted on the side in the left direction L of the image controller 71. Therefore, an operator can insert/remove the USB memory into/out of the electrical unit 70 (the image controller 71) by standing on the side in the front direction F of the apparatus body 10 in inputting image data, upgrading the firmware, installing optional software, or the like. Still further, because the USB memory can be inserted/removed into/out of the electrical unit 70 (the image controller 71) in the right and left direction X on the side in the left direction L of the image controller 71, the USB memory can be inserted/removed into/out of the electrical unit 70 without interfering with the toner supplying unit 20 disposed on the side in the right direction R of the electrical unit 70.

Next, an operation of the electrical unit 70 described above will be described in detail. Because the electrical unit 70 is covered by the outer cover 74 during an operation of the image forming apparatus 2 as shown in FIG. 2, the user can operate the image forming apparatus 2 without touching the image controller 71 and the HDD 72. Still further, because there is the wide work space 11a in front of the electrical unit 70, the operator can perform such works of folding the sheet S and of arranging order of the sheets S by utilizing the work space 11a.

In replacing the HDD 72 in which image data has been stored at an appropriate timing, the user at first uncovers the outer cover 74. Then, the user removes the inner cover 75 and pulls the HDD 72 toward the side. Thus the user replaces the HDD 72 by pulling the old HDD 72 out of the frame 73 and inserting a new HDD 72 into the frame 73. The replacement finishes by attaching the inner cover 75 and by covering the outer cover 74 from the top. During the replacement work of the HDD 72, the user can perform the whole work readily at the front standing position by standing on the side in the front direction F of the apparatus body 10. Because the replacing work of the HDD 72 can be done just by pulling the old HDD 72 to the left side and inserting the new HDD 72 in the right side, it is possible to make the work much easier for the user than the work otherwise performed on the back of the apparatus body 10.

As described above, according to the image forming apparatus 2 of the present embodiment, the electrical unit 70 is provided so as to project upward on the upper surface 10a of the apparatus body 10. This arrangement makes it possible to reduce the installation space of the apparatus body 10 as compared to a case where the electrical unit 70 is contained within the apparatus body 10. Still further, because the user faces the electrical unit 70 while standing in front of the apparatus body 10, the user can readily insert/remove the HDD 72 into/out of the electrical unit 70.

Still further, according to the image forming apparatus 2 of the present embodiment, the electrical unit 70 is disposed on the side in the back direction B on the upper surface 10a of the apparatus body 10, it is possible to assure the wide work space 11a on the front side of the upper surface 10a of the apparatus body 10. Therefore, it is possible to improve the workability favorably because the readily reachable front space can be utilized even for the user, such as a user of a wheel chair, who has otherwise difficulty reaching the work space 11a. Still further, because the electrical unit 70 is disposed on the back side of the work space 11a, it is possible to prevent a sheet or a small item placed on the work space 11a during works from dropping on the back side of the apparatus body 10 and to improve the workability. The user such as the user of a wheel chair in particular who has difficulty reaching the work space 11a often works on the front side of the work space 11a and has a possibility of pushing a sheet or the like erroneously to the back side. However, the item pushed to the back side will not drop because it abuts against the electrical unit 70 disposed on the back side of the work space 11a.

According also to the image forming apparatus 2 of the present embodiment, the level of the work space 11a from the floor surface 4 is set at 1000 mm, so that it is possible to improve the work efficiency for the users of the wide range of statures including a person with a short body height in using the work space 11a while standing in front of the apparatus body 10.

According to the image forming apparatus 2 of the present embodiment, the electrical unit 70 is disposed on the back side of the apparatus body 10. This arrangement makes it possible to prevent the workability from dropping because the electrical unit 70 does not interfere the attachment/removal of the exposure units 43y and 43m to/out of the apparatus body 10 performed by uncovering the upper cover 11 during maintenance.

According to the image forming apparatus 2 of the present embodiment, the work space 11a is set to be wider than the maximum size sheet S on which the image forming portion 40 can form an image. Therefore, the maximum size sheet S on which the image has been formed by the image forming apparatus 2 can be spread on the work space 11a, it is possible to improve the workability on such sheet S as compared to a case where there is no such wide work space.

According to the image forming apparatus 2 of the present embodiment, the HDD 72 is formed into the rectangular parallelepiped shape and is disposed such that the thickness direction thereof is paralleled with the front-back direction of the apparatus body 10. Therefore, as compared to a case where the HDD 72 is not disposed as described above, it is possible to reduce the thickness in the front-back direction of the electrical unit 70 and to assure the wide work space 11a on the side in the front direction F of the electrical unit 70.

According to the image forming apparatus 2 of the present embodiment, the plurality of HDDs 72 is provided while being vertically arrayed within the electrical unit 70. Therefore, it is possible to reduce the thickness in the front-back direction of the electrical unit 70 and to assure the wide work space 11a on the side in the front direction F of the electrical unit 70 as compared to a case where the HDDs 72 are not vertically arrayed. Still further, because it is possible to reduce the size of the HDDs in the right and left direction X as compared to a case where the HDDs 72 are arrayed in the right and left direction X, it is possible to prevent the HDDs from interfering with the toner supplying unit 20 and to reduce the installation space of the image forming apparatus 2.

According to the image forming apparatus 2 of the present embodiment, the HDD 72 can be attached/removed to/out of the electrical unit 70 from the side in the left direction L of the apparatus body 10. Therefore, it is possible to facilitate the replacing work of the HDD 72 because it is not necessary for the user to move the apparatus body 10 to the front side and to go around to the back part of the apparatus body 10 to open a back cover for example, like a case where the electrical unit 70 is contained within a back part of the apparatus body 10.

According to the image forming apparatus 2 of the present embodiment, the electrical unit 70 is disposed above the image forming portion 40. Therefore, as compared to a case where the electrical unit 70 is provided on the side in the back direction B on the same level with the image forming portion 40, it is possible to shorten a front-back length (depth) of the apparatus body 10 and to downsize the apparatus body 10.

According to the image forming apparatus 2 of the present embodiment, the HDD 72 can be inserted/pulled into/out of the electrical unit 70 in the right and left direction X on the side in the left direction L of the apparatus body 10. Therefore, it is possible to replace the HDD 72 without interfering with the toner supplying unit 20 disposed adjacent the side in the right direction R of the electrical unit 70 and to keep the workability high.

While the case where the HDD 72 can be inserted/pulled into/out of the electrical unit 70 in the right and left direction X on the side in the left direction L of the apparatus body 10 has been described in the embodiment described above, the present invention is not limited to such configuration and may be configured such that the HDD 72 can be inserted/pulled into/out of the electrical unit 70 on the side in the right direction R of the electrical unit 70. In this case, it is preferable to dispose the toner supplying unit 20 at a position not interfering with the HDD 72. Still further, the insertion/pull direction of the HDD 72 is not limited to the right and left direction X (side directions) and may be a side in the upper direction U or the front direction F of the electrical unit 70. That is, the insertion/pull direction of the HDD 72 may be at least one direction among the upper direction U, the left direction L, the right direction R, and the front direction F, as long as the HDD 72 can be removably inserted, except of directions in which the workability is deteriorated such as the sides in the back direction B and the lower direction D. It is noted that the insertion/pull direction of the USB memory into/out of the image controller 71 may be also at least one direction among the upper direction U, the left direction L, the right direction R, and the front direction F.

Still further, while the case where the image controller 71 is contained on the side in the front direction F of the electrical unit 70 and the HDD 72 is contained on the side in the back direction B has been described in the present embodiment, the present invention is not limited to such configuration. For instance, the HDD 72 may be contained on the side in the front direction F of the electrical unit 70 and the image controller 71 may be contained on the side in the back direction B.

Still further, while the electrical unit 70 of the image forming apparatus 2 of the image forming system 1 having the sheet processing apparatus 3 has been described in the present embodiment, the present invention is not limited to that. For instance, the present invention is applicable also to an electrical unit of a single image forming apparatus having an image reading portion and a discharge tray.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-183168, filed on Sep. 9, 2014 which is hereby incorporated by reference herein in its entirety.

What is claimed is:

1. An image forming apparatus, comprising:
   a main body;
   an image forming portion, contained within the main body, configured to form an image;
   a control board configured to control the image forming portion;
   an electrical unit configured to store the control board; and
   a storage device detachably mounted to the electrical unit and configured to be capable of storing image information, and configured to be capable of electrically communicating with the control board in a case that the storage device is mounted to the electrical unit,
   wherein the electrical unit is provided to project upward from a back side of a top surface of the main body with a back surface of the electrical unit along a back surface of the main body,
   the storage device is formed in board shape, and
   the control board and the storage device are disposed along the back surface of the electrical unit.

2. The image forming apparatus according to claim 1, wherein a front side of the electrical unit on the top surface of the main body is a flat surface spreading in the horizontal direction.

3. The image forming apparatus according to claim 2, wherein the flat surface is wider than a maximum size sheet on which the image forming portion can form an image.

4. The image forming apparatus according to claim 2, wherein the main body includes an opening portion, provided at an upper part thereof, configured to enable an access to an inside thereof from an outside and an upper cover capable of opening/closing the opening portion and on which the flat surface is provided at an upper surface thereof,
   wherein the image forming portion includes an image bearing member positioned and configured to bear an image and an exposure unit, disposed above the image carrier, configured to form a latent image by exposing the electrified image carrier, and
   wherein the exposure unit is disposed under the opening portion and is replaceable through the opening portion opened by uncovering the upper cover.

5. The image forming apparatus according to claim 1, wherein the storage device is formed into a rectangular parallelepiped shape and is disposed such that a thickness direction thereof is directed in conformity with a front-back direction of the main body.

6. The image forming apparatus according to claim 1, wherein the storage device is one of a plurality of storage devices and the plurality of the storage devices is arrayed in a vertical direction.

7. The image forming apparatus according to claim 1, wherein the storage device is detachably mountable to the electrical unit at least from one direction of upper, right, left, and front directions of the main body.

8. The image forming apparatus according to claim 7, wherein the image forming portion includes a toner bottle disposed on one side of the electrical unit with respect to a widthwise direction of the main body, and the storage device is detachably mountable to the electrical unit from the other side of the electrical unit.

9. An image forming system, comprising:
   image forming apparatus as set forth in claim 1; and
   a sheet processing apparatus positioned and configured to implement a predetermined process on a sheet discharged out of the image forming apparatus.

10. The image forming system according to claim 9, wherein the image forming portion includes a toner bottle disposed on one side of the electrical unit with respect to a widthwise direction of the main body,
   wherein the sheet processing apparatus is disposed on the other side of the electrical unit, and
   wherein the storage device is detachably mountable to the electrical unit from the other side of the electrical unit.

* * * * *